(12) United States Patent
Paris

(10) Patent No.: US 6,769,527 B1
(45) Date of Patent: Aug. 3, 2004

(54) STOP CLUTCH ASSEMBLY

(75) Inventor: Brian D. Paris, Warminster, PA (US)

(73) Assignee: Harold Beck & Sons, Inc., Newton, PA (US)

( * ) Notice: Subject to any disclaimer, the term of this patent is extended or adjusted under 35 U.S.C. 154(b) by 0 days.

(21) Appl. No.: 10/290,772

(22) Filed: Nov. 8, 2002

(51) Int. Cl.$^7$ ............................................. F16D 67/02
(52) U.S. Cl. ..................... 192/223.3; 74/625; 192/16
(58) Field of Search ............................. 192/223.3, 223, 192/16, 14, 19, 54.52, 93 A; 74/625, 724, 425; 464/32

(56) References Cited

U.S. PATENT DOCUMENTS

| | | | |
|---|---|---|---|
| 1,634,861 A | | 7/1927 | Weymann |
| 2,827,994 A | * | 3/1958 | Tiedeman et al. ........ 192/93 A |
| 2,834,443 A | | 5/1958 | Olchawa |
| 3,251,441 A | * | 5/1966 | Winter ..................... 192/54.52 |
| 3,667,578 A | | 6/1972 | Johnson |
| 4,470,490 A | | 9/1984 | Morel |
| 4,676,352 A | * | 6/1987 | Randolph ................. 192/223.3 |
| 4,909,363 A | * | 3/1990 | Trommer ................. 192/223.3 |
| 5,529,157 A | | 6/1996 | Desrochers |
| 6,471,028 B1 | * | 10/2002 | Larson ..................... 192/223.3 |

FOREIGN PATENT DOCUMENTS

JP             56-55731 A    *  5/1981

* cited by examiner

Primary Examiner—Rodney H. Bonck
(74) Attorney, Agent, or Firm—Akin Gump Strauss Hauer & Feld, LLP

(57) ABSTRACT

A stop clutch assembly comprises a shaft fixed for receiving a driving torque. A clutch disk is rotatably disposed about the shaft and is axially slidable thereon. A drive collar rotates the clutch disk through a clutch ball lodged in a biconical clutch cavity formed between the clutch disk and the drive collar. A power takeoff member is rotatably disposed about the shaft. The clutch disk positions a load connected to the power takeoff member through a drive ball lodged in a biconical drive cavity formed between the power take off member and the clutch disk. A ring gear having a friction collar attached thereto is rotatably disposed about the shaft. The clutch disk is engaged with the friction collar when the clutch disk is in a first position, and the clutch disk is disengaged from the friction collar when the clutch disk is in a second position.

19 Claims, 3 Drawing Sheets

STOP CLUTCH ASSEMBLY

BACKGROUND OF THE INVENTION

1. Field of the Invention

This invention relates generally to a stop clutch assembly, and more particularly to a stop clutch assembly for use with a power driven bi-directional rotating shaft which is subject to back loading.

2. Description of the Related Art

Power driven shafts subject to back loading are well known in the field of control systems where, for instance, a servo electric motor is utilized to position a valve in a pipeline having a fluid flowing therein. Variations in fluid flow may cause backloading of the power driven shaft, thereby altering the valve position. Since positive positioning is desirable, various methods have been utilized to prevent significant backdrive.

One such approach involves using a spring loaded brake disk adapted to co-act with a friction disk fixed to a fixed housing for the power driven shaft. The brake disk is formed as part of a power takeoff member adapted to transmit power from the shaft to a load. Spring pressure maintains the brake disk against the friction disk to prevent backloading of the shaft. Any subsequent backload is braked by this engagement. However, a disadvantage exists with the spring loaded brake disk since the spring pressure necessary to resist backloading causes excessive drag with respect to driving positioning loads.

U.S. Pat. No. 3,667,578 ("the '578 patent") for a bi-directional drive released brake, which is incorporated herein by reference, eliminates the above identified disadvantage by providing an improved stop clutch assembly. The stop clutch assembly of the '578 patent improves on the spring loaded brake disk of the prior art by transmitting power from the shaft to the load through a collar and ball drive which lifts the brake disk off of the friction disk upon rotation of the drive shaft. Cessation of power allows the spring pressure to force the brake disk back into braking engagement with the friction disk. The '578 patent also discloses manual positioning of the load using a wheel located at the motor end of the drive shaft. However, in practice, manual rotation has been found to be difficult in high torque applications. Additionally, since manual rotation of the motor shaft in the stop clutch assembly of the '578 patent occurs through the motor itself, the user may damage the internal components of the system when manually assisting the motor. Therefore, the stop clutch assembly of the '578 patent does not provide a system which enables a user to manually position a load, while simultaneously preventing internal damage to the mechanism itself.

Accordingly, there is a need for an improved stop clutch device which enables manual high torque rotation of a load, and further provides a means for preventing damage to the stop clutch mechanism itself.

BRIEF SUMMARY OF THE INVENTION

According to one aspect of the invention, a stop clutch assembly comprises a shaft for receiving a driving torque. A drive collar is concentrically fixed to the shaft. A clutch disk is rotatably disposed about the shaft and is axially slidable thereon. The clutch disk has a first surface which is adjacent to a collar surface of the drive collar. The first surface of the clutch disk and the collar surface of the drive collar each have at least one conical depression formed therein, such that each conical depression in the first surface of the clutch disk is opposingly aligned with a corresponding conical depression in the collar surface of the drive collar. A biconical clutch cavity is formed between each of the correspondingly aligned conical depressions in the collar surface of the drive collar and the first surface of the clutch disk. Each biconical clutch cavity has a clutch ball lodged therein.

A power takeoff member is rotatably disposed about the shaft. The power takeoff member is connected to a load. A takeoff surface of the power take off member is adjacent to a second surface of the clutch disk which is opposite the first surface of the clutch disk. The takeoff surface of the power takeoff member and the second surface of the clutch disk each have at least one conical depression formed therein, such that each conical depression in the second surface of the clutch disk is opposingly aligned with a corresponding conical depression in the takeoff surface of the power takeoff member. A biconical drive cavity is formed between each of the correspondingly aligned conical depressions in the takeoff surface of the power takeoff member and the second surface of the clutch disk. Each biconical drive cavity has a drive ball lodged therein.

A ring gear has a friction collar attached thereto. The ring gear is rotatably disposed about the shaft. The ring gear is positioned on the shaft such that a surface of the friction collar opposes the clutch disk. The clutch disk is engaged with the friction collar when the clutch disk is in a first position, and the clutch disk is disengaged from the friction collar when the clutch disk is in a second position.

According to a second aspect of the invention, a clutch disk is rotatably disposed about a shaft and is axially slidable thereon. The clutch disk has a first surface which is adjacent to a collar surface of a drive collar. The first surface of the clutch disk and the collar surface of the drive collar each have at least one conical depression formed therein, such that each conical depression in the first surface of the clutch disk is opposingly aligned with a corresponding conical depression in the collar surface of the drive collar. A biconical clutch cavity is formed between each of the correspondingly aligned conical depressions in the collar surface of the drive collar and the first surface of the clutch disk. Each biconical clutch cavity has a clutch ball lodged therein.

A power takeoff member is rotatably disposed about the shaft. The power takeoff member is connected to a load. A takeoff surface of the power take off member is adjacent to a second surface of the clutch disk which is opposite the first surface of the clutch disk. The takeoff surface of the power takeoff member and the second surface of the clutch disk each have at least one conical depression formed therein, such that each conical depression in the second surface of the clutch disk is opposingly aligned with a corresponding conical depression in the takeoff surface of the power takeoff member. A biconical drive cavity is formed between each of the correspondingly aligned conical depressions in the takeoff surface of the power takeoff member and the second surface of the clutch disk. Each biconical drive cavity has a drive ball lodged therein.

A ring gear has a friction collar attached thereto. The ring gear is rotatably disposed about the shaft. The ring gear is positioned on the shaft such that a surface of the friction collar opposes the clutch disk. The clutch disk is engaged with the friction collar when the clutch disk is in a first position, and the clutch disk is disengaged from the friction collar when the clutch disk is in a second position.

A drive member engages the ring gear. The drive member effects rotary motion of the ring gear when an external force is applied to the drive member. The drive member otherwise locks the ring gear.

BRIEF DESCRIPTION OF THE SEVERAL VIEWS OF THE DRAWINGS

The foregoing summary, as well as the following detailed description of preferred embodiment of the invention, will be better understood when read in conjunction with the appended drawings. For the purpose of illustrating the invention, there is shown in the drawings an embodiment which is presently preferred. It should be understood, however, that the invention is not limited to the particular arrangement and instrumentality show 21. In the drawings.

DETAILED DESCRIPTION OF THE INVENTION

Figure 1:
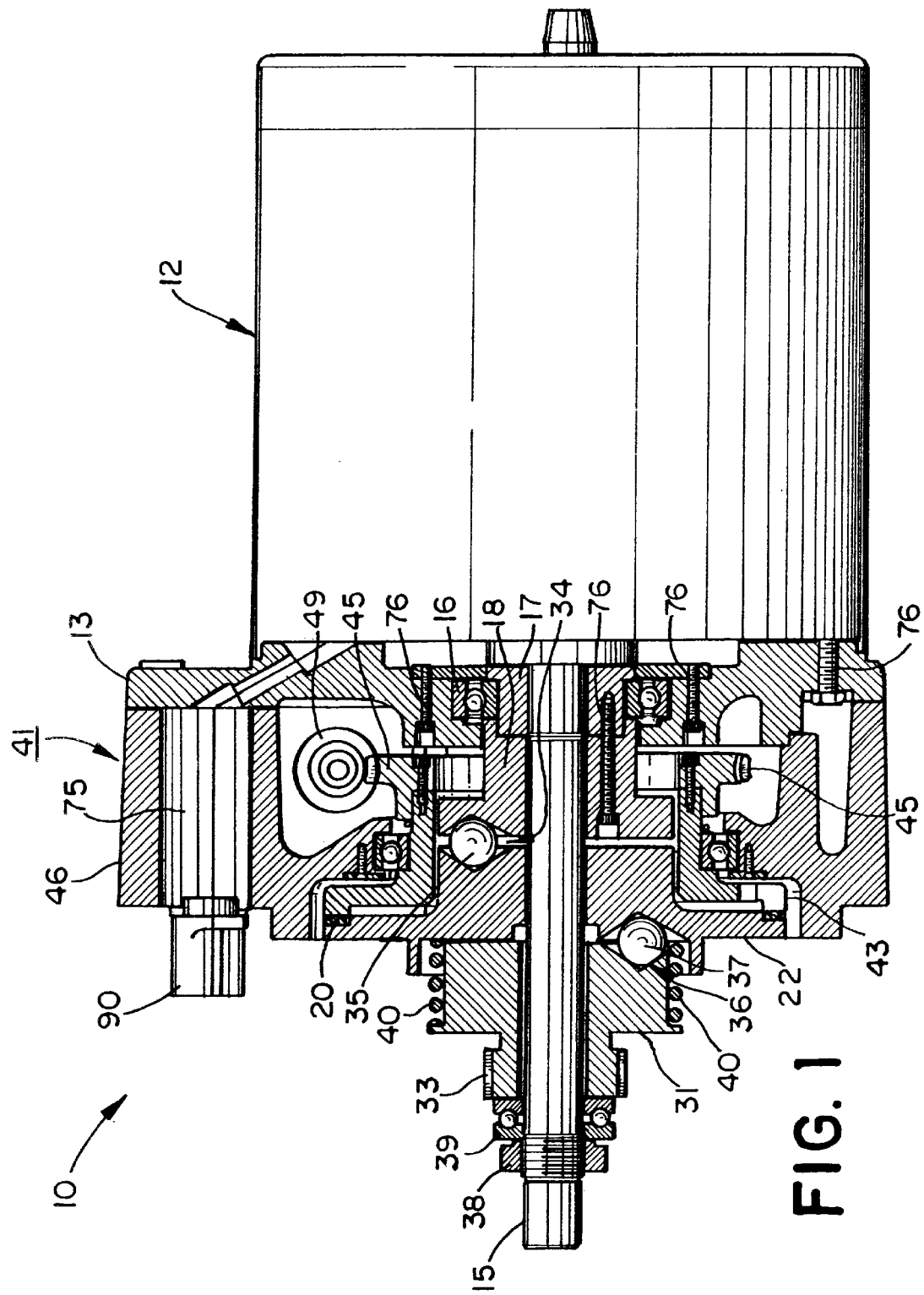
FIG. 1 is a cross sectional view of a preferred embodiment of a stop clutch assembly according to the present invention.

Certain terminology is used in the following description for convenience only and is not limiting. The words "right", "left", "lower" and "upper" designate directions in the drawings to which reference is made. The words "inwardly" and "outwardly" refer to directions towards and away from, respectively, the geometric center of the stop clutch assembly and designated parts thereof. The terminology includes the words above specifically mentioned, derivatives thereof and words of similar import.

Figure 2:
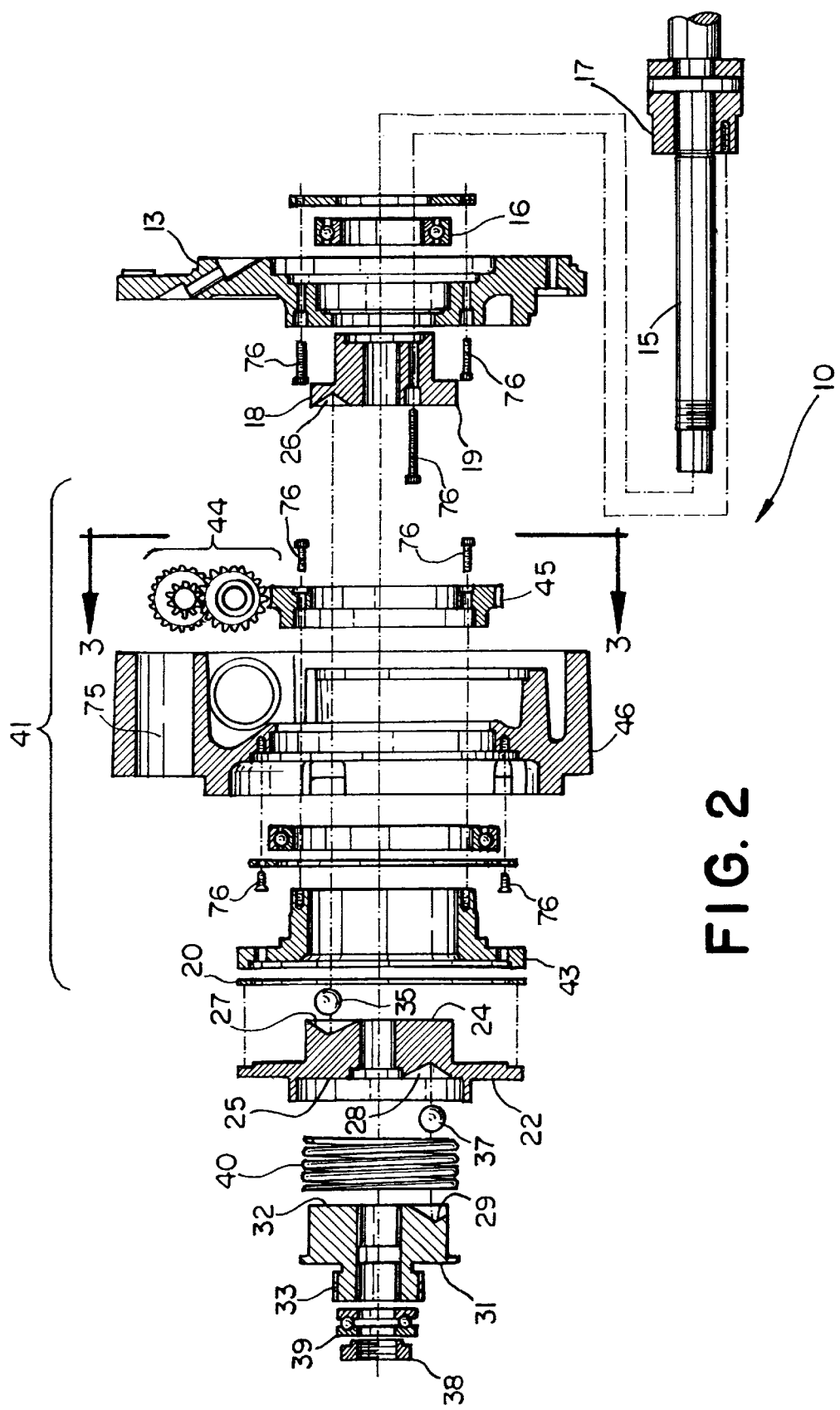
FIG. 2 is a partial exploded view of the stop clutch assembly of FIG. 1.
Figure 3:
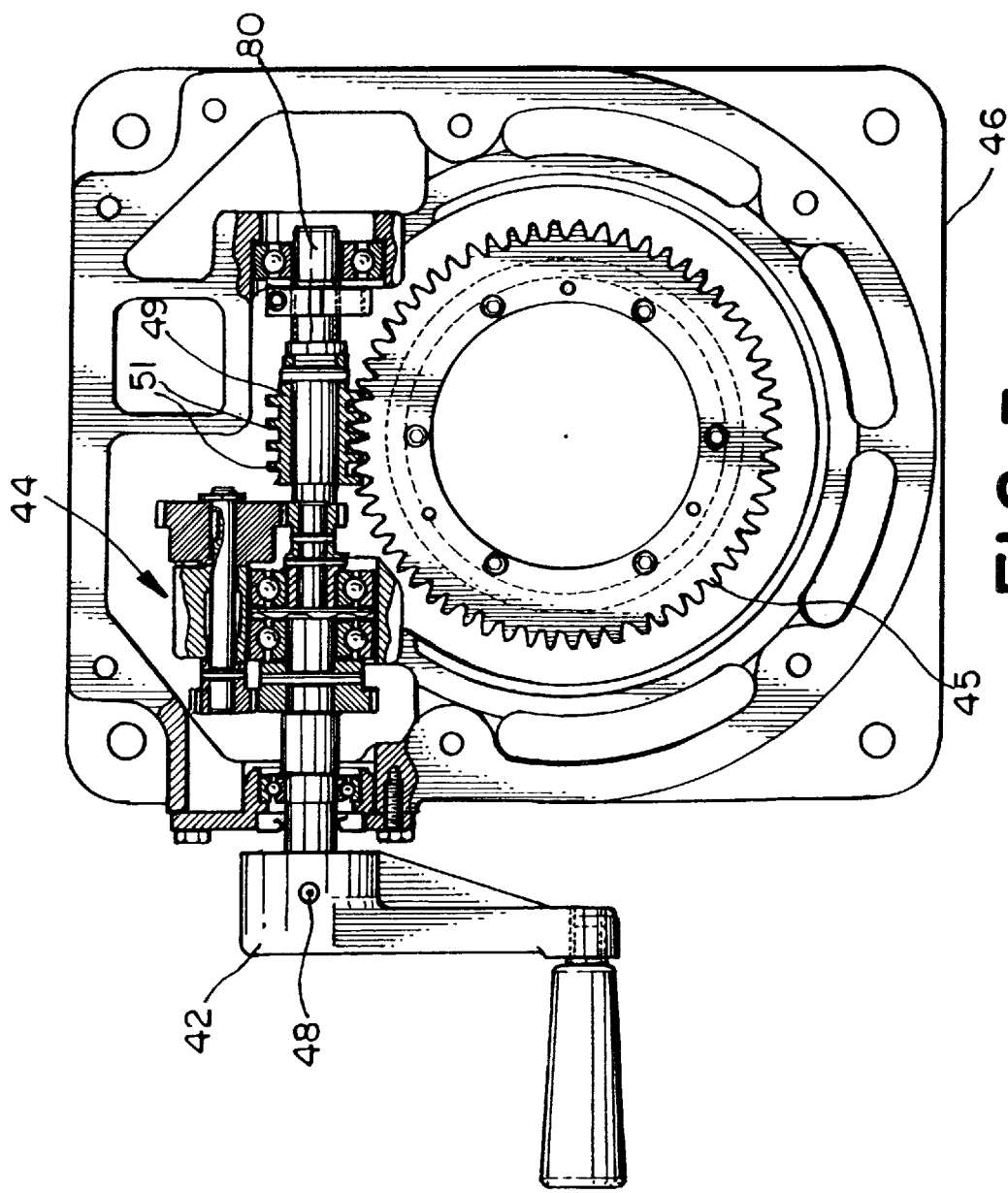
FIG. 3 is a cross sectional view along the axis "3—3" of FIG. 2 showing the stop clutch assembly of FIG. 1.

Referring to FIGS. 1–3, a preferred embodiment of the stop clutch assembly 10 of the present invention is shown. The stop clutch assembly 10 comprises an electric motor 12 rigidly mounted to a motor mount 13. A shaft 15 is adapted for receiving a driving torque from the electric motor 12. The shaft 15 projects through and is rotatably journaled within the motor mount 13. The electric motor 12 rotates the shaft 15 to position a load such as a vane or a valve (not shown) connected to a power takeoff member 31. It should be understood that the driving torque applied by the electric motor 12 to rotate the shaft 15 may be applied by other sources, such as, for example, a turbine drive means, without departing from the spirit and scope of the present invention.

The stop clutch assembly 10 also includes a drive hub 17. The drive hub 17 is concentrically fixed to the shaft 15, preferably by means of a pin, and is rotatably journaled within the motor mount 13, preferably via a first bearing 16. An annular drive collar 18 is concentrically disposed about the shaft 15 and preferably fixedly attached to the drive hub 17 using screws 76. However, the annular drive collar 18 may be attached to the shaft 15 or the drive hub 17 by other means without departing from the spirit and scope of the present invention. The annular drive collar 18 includes a collar surface 19 having one or more conical depressions 26, the centers of which are located at a predetermined distance from the center of the shaft 15.

A clutch disk 22 is rotatably disposed about and axially slidable on the shaft 15. The clutch disk 22 is positioned on the shaft 15 such that a first surface 24 of the clutch disk 22 is adjacent to the collar surface 19 of the annular drive collar 18. The first surface 24 of the clutch disk 22 includes one or more conical depressions 27. The centers of the conical depressions 27 are located at a substantially equal distance from the center of the shaft 15 as are the centers of the conical depressions 26 on the collar surface 19. The conical depressions 26 in the collar surface 19 of the drive collar 18 are each opposingly aligned with corresponding conical depressions 27 in the first surface 24 of the clutch disk 22, to form one or more biconical clutch cavities 34 between the drive collar 18 and the clutch disk 22. One or more clutch balls 35 are lodged in each biconical clutch cavity 34 and are supported in simultaneous rolling contact with the clutch disk 22 and the annular drive collar 18 by means of the biconical clutch cavity 34. Axial movement of the clutch disk 22 on the shaft 15 is limited to the right by engagement of the clutch balls 35 in the clutch cavities 34 (if the shaft 15 is driving the power takeoff member 31) or engagement of a friction material 20 disposed on the clutch disk 22 with a friction collar 43 (if the shaft 15 is not driving the power takeoff member 31). Axial movement of the clutch disk 22 is limited to the left by engagement with the power takeoff member 31 and the spring 40, both described in greater detail below.

The power takeoff member 31 for driving the load is rotatably disposed about the shaft 15 adjacent to the clutch disk 22. The power takeoff member 31 includes a takeoff surface 32 which is adjacent to a second surface 25 of the clutch disk 22. The power takeoff member 31 preferably includes gear teeth 33 for engagement with a gear shaft (not shown) coupled to the load for driving or otherwise positioning the load according to rotation of the power takeoff member 31. Those of ordinary skill in the art will recognize that the present invention does not require the use of the geared power takeoff member 31 as shown in the disclosed drawings to drive the load, but that other conventional power take off means, such as flexible couplings, sleeved couplings, chain drives or other devices generally known in the art may be utilized to drive the load attached to the stop clutch assembly 10.

The second surface 25 of the clutch disk 22 and the takeoff surface 32 of the power takeoff member 31 each include one or more conical depressions 28, 29, whose centers are located at a substantially equal distance from the center of the shaft 15. The conical depressions 28 in the second surface 25 of the clutch disk 22 are each opposingly aligned with corresponding conical depressions 29 in the takeoff surface 32 of the power takeoff member 31 to form one or more biconical drive cavities 36 between the clutch disk 22 and the power takeoff member 31. One or more drive balls 37 are lodged in each biconical drive cavity 36 and are supported in simultaneous rolling contact with the clutch disk 22 and the power takeoff member 31 by means of the biconical clutch cavity 36. Axial movement of the power takeoff member 31 on the shaft 15 is limited to the right by engagement of the drive balls 37 in the drive cavities 36 (if the power takeoff member 31 is driving a load) and the spring 40 (if the power takeoff member 31 is unloaded). Axial movement of the power takeoff member 31 is limited to the left by engagement with an annular thrust bearing 39. The annular thrust bearing 39 is rotatably sleeved upon the shaft 15 adjacent to the power takeoff member 31, opposite the clutch disk 22. An annular terminal collar 38 is sleeved upon the shaft 15 and preferably threadedly affixed thereto adjacent to the annular thrust bearing 39. The terminal collar 38 may also be fixed to the shaft 15 by means of a pin, key or other device generally known by those of ordinary skill in the art. Thus, the power takeoff member 31 can move axially along the shaft 15 to the left only as far as permitted by the annular terminal collar 38.

Those of ordinary skill in the art will recognize that the conical depressions 26, 27, 28, 29 which form the biconical cavities 34, 36 need not all have the same depth or angle, depending on the desired force transfer relationships between the drive collar 18 and the clutch disk 22, and between the clutch disk 22 and the power takeoff member 31. Furthermore, the depressions formed in the surfaces of the drive collar 18, the clutch disk 22 and the power takeoff member 31 may have a shape other than conical. For example, the surfaces 19, 24, 25 and 32 may have half-round depressions, such that a cylindrical cavity is formed between the respective surfaces, instead of the biconical cavities 34, 36. In such a design, a cylindrical part, such as a dowel pin, replaces the clutch and drive balls 35, 37.

The clutch disk 22 includes a friction material 20 disposed on the clutch disk 22. The friction material 20 is preferably secured to the clutch disk 22 by an adhesive within a recess or annular depression formed within the clutch disk 22. When the clutch disk 22 is in a first position, the friction material 20 is fully engaged with the friction collar 43, thereby preventing the clutch disk 22 from rotating with respect to the friction collar 43 and transferring rotational motion of the friction collar 43 to the clutch disk 22. When the clutch disk 22 is in a second position, the friction material 20 is disengaged from the friction collar 43 and is spaced from or in sliding contact with the friction collar 43, allowing the clutch disk 22 and the friction collar 43 to rotate about the shaft 15 with respect to each other. The friction material 20 may be any material generally known in the art for providing frictional engagement between surfaces, and may be disposed on either the clutch disk 22 or the friction collar 43 without departing from the spirit and scope of the present invention.

A helical spring 40 is preferably disposed about the power takeoff member 31 and maintained in compression between the clutch disk 22 and the power takeoff member 31. The restoring force of the helical spring 40 establishes a predetermined torque threshold by biasing the clutch disk 22 into engagement with the friction collar 43 whenever the net axial force applied by the clutch disk 22 on the helical spring 40 is less than the restoring force of the helical spring 40. In general, the clutch disk 22 is biased into engagement with the friction collar 43 (by virtue of the friction material 20 on the clutch disk 22 being engaged with the friction collar 43) when the stop clutch assembly 10 is at rest, when there is little or no driving torque bring applied to the shaft 15 or when there is a counter torque applied to the power takeoff member 31 which is significantly greater than the driving torque applied by the motor 12.

The stop clutch assembly 10 also includes a hand crank mechanism 41 for manually rotating the power takeoff member 31 to drive the load. The hand crank mechanism 41 is mounted within a hand crank housing 46. The hand crank housing 46 is attached to the motor mount 13, preferably using screws or fasteners 76. The shaft 15 thus preferably projects through and is rotatable within the hand crank housing 46. The hand crank housing 46 also includes a wire passage 75 through which electrical conductors for providing electricity to the electric motor 12 can be channeled to an electrical motor connector 90.

The hand crank mechanism 41 includes a ring gear 45 rotatably disposed about the shaft 15 and the annular drive collar 18. The friction collar 43 is attached to the ring gear 45, such that a surface of the friction collar 43 opposes the friction material 20 on the clutch disk 22 and rotation of the ring gear 45 about the shaft 15 also rotates the friction collar 43. When the clutch disk 22 is engaged with the friction collar 43, rotation of the ring gear 45 rotates the clutch disk 22 and the power takeoff member 31 as described in greater detail below.

The hand crank mechanism 41 also includes a drive member for rotating the ring gear 45 and the friction collar 43 via an external force. In the preferred embodiment of the stop clutch assembly 10, the drive member is a worm gear 49. The worm gear 49 is preferably mounted within the hand crank housing 46 and engages the ring gear 45, such that rotation of the worm gear 49 rotates the ring gear 45 about the shaft 15. When the clutch disk 22 is engaged with the friction collar 43 through the friction material 20, the worm gear 49 is capable of driving the load on the power takeoff member 31 using an external force other than the driving torque on the shaft 15 provided by the motor 12. The worm gear 49 is rotatable bi-directionally to correspondingly rotate the ring gear 45 about the shaft 15 in response to the external force.

The worm gear 49 includes worm teeth 51 which engage the ring gear 45, such that the worm gear 49 is self-locking with respect to the ring gear 45. Although the worm gear 49 is capable of rotating the ring gear 45 in either direction in response to the external force, the self-locking feature of the worm gear 49 prevents the ring gear 45 from rotating due to forces applied to the ring gear 45 by the load on the power takeoff member 31. Since the self-locking feature of the worm teeth 51 against the ring gear 45 prevents the ring gear 45 from rotating the worm gear 49, a counter torque applied by the load to the power takeoff member 31 and acting on the friction collar 43, is thus prevented from re-positioning the load.

The lead angle of the worm teeth 51 on the worm gear 49 is an important factor in determining whether the worm gear 49 is self-locking with respect to the ring gear.45. In the preferred embodiment of the present invention, the lead angle of the worm gear 49 is approximately 4.5 degrees, or close to being parallel to the rotating axis of the shaft 15. However, various factors, including the coefficient of friction between the worm gear 49 and the ring gear 45, the gear shapes and sizes within the hand crank mechanism 41, and the resulting pressure angles within the hand crank mechanism 41, determine the necessary lead angle for the worm gear 49 to maintain a self-locking effect. Thus, the worm gear 49 could have a lead angle which is substantially larger or smaller than that used by the preferred embodiment of the present invention. So long as the drive member is self-locking with respect to the ring gear 45, and remains stationary in response to a force applied by the ring gear 45, the drive member may be a combination of other gears or mechanisms generally known in the art for rotating the ring gear 45. Thus, those of ordinary skill in the art will recognize that the drive member for the hand crank mechanism 41 of the present invention need not be the worm gear 49 as utilized in the preferred embodiment shown in the disclosed drawings.

The worm gear 49 is preferably coupled to an actuating member which provides the external force for manual rotation of the hand crank mechanism 41, and thus manual positioning of the load on the power takeoff member 31. In the preferred embodiment of the stop clutch assembly 10, the actuating member is a hand crank 42. Rotation of the hand crank 42 enables a user to manually bi-directionally rotate the worm gear 49 and the ring gear 45. When the friction collar 43 is in engagement with the clutch disk 22, rotation of the hand crank 42 thus rotates the clutch disk 22. The actuating member to which the worm gear 49 is coupled, need not be the hand crank 42 as disclosed by the present invention, but may be any mechanism or means generally known in the art for inputting an external force for rotation of the worm gear 49.

The hand crank mechanism 41 further includes a gear train 44 which couples the actuating member or hand crank 42 to the worm gear 49. In the present embodiment of the stop clutch assembly 10, the gear train 44 comprises a series of gears to transfer external force applied to the hand crank 42 to the worm gear 49. The gear train 44 preferably has the effect of requiring greater external force to be applied by a user to the hand crank 42 to rotate the ring gear 45 and thus manually position a load on the power takeoff member 31. Correspondingly, such a configuration of the gear train 44 increases rotation of the worm gear 49 relative to rotation of the hand crank 42. Depending on the composition of the gear train 44 (for example, the number, size and order of the gears therein), the gear ratio between the hand crank 42 and the worm gear 49 may be adapted to meet a specific application. Similarly, it is possible to configure the gear train 44 to decrease the force required on the hand crank 42, thereby decreasing rotation of the worm gear 49 relative to rotation of the hand crank 42.

In the preferred embodiment of the stop clutch assembly 10, the hand crank mechanism 41 also includes a shear pin 48 which disconnects the actuating member or the hand crank 42 from the worm gear 49 when a predetermined torque applied to the hand crank 42 is exceeded. The shear pin 48 thus prevents damage to the stop clutch assembly 10 from too great of an external force being applied to the hand crank 42. In the preferred embodiment of the stop clutch assembly 10, the predetermined torque is approximately 1.5 times the rated torque of the electric motor 12. Those of ordinary skill in the art will recognize that the shear pin 48 may be any other means or mechanism commonly known in the art to disconnect the hand crank 42 from the hand crank mechanism 41. Depending on the application and the desired characteristics of the stop clutch assembly 10, the shear pin 48 may be capable of withstanding a rated torque which is substantially more or less than that which is disclosed in the preferred embodiment of the stop clutch assembly 10.

FIG. 1 shows the stop clutch assembly 10 of a preferred embodiment of the present invention when the system is at rest (i.e., no loads on the system). Specifically, the system is at rest when there is: (1) no driving torque being applied by the electric motor 12 to the shaft 15, (2) no external force being applied by the hand crank 42 to the ring gear 45, and (3) no counter torque being applied by a load engaging the power takeoff member 31 with an external back load. When the stop clutch assembly 10 is at rest, the spring 40 biases the clutch disk 22 into engagement with the friction collar 43 via the friction material 20.

Axial movement of the clutch disk 22 is partially resisted by the spring 40, and is limited by the abutment of the power takeoff member 31 with the annular thrust bearing 39. Thus, if the axial force on the clutch disk 22 caused by the driving torque applied by the motor 12 is less than the restoring force of the spring 40, the clutch disk 22 remains engaged with the friction collar 43 via the friction material 20.

However, if there is no counter torque on the power takeoff member 31, and if the driving torque of the motor 12 on the shaft 15 is translated into an axial force on the clutch disk 22 which is greater than or equal to the restoring force that the spring 40 provides against the clutch disk 22 in the opposite direction, the clutch disk 22 moves axially on the shaft 15 away from the friction collar 43. As the electric motor 12 applies the driving torque to the shaft 15, the shaft 15 rotates correspondingly in a clockwise or counter clockwise direction. As the shaft 15 rotates, the annular drive collar 18 rotates with the shaft 15, causing the clutch balls 35 to exert both a rotary force and an axial force upon the clutch disk 22 by reason of their contact with the biconical clutch cavity 34. The axial and rotary forces acting upon the clutch disk 22 cause the clutch disk 22 to move axially along the shaft 15, out of engagement with the friction collar 43, and to simultaneously rotate with the drive collar 18. Rotation of the clutch disk 22 causes the drive balls 37 to exert a rotary force upon the power takeoff member 31 by reason of their contact with the biconical drive cavity 36.

When the driving torque applied by the electric motor 12 to the shaft 15 results in an axial force on the clutch disk 22 which becomes less than the restoring force of the spring 40, the clutch disk 22 is no longer forced axially toward the power takeoff member 31 by the clutch balls 35. Therefore, the clutch disk 22 is urged back into engagement with the friction collar 43 (the position shown in FIG. 1) by the biasing action of the spring 40, and the power takeoff member 31 no longer rotates. Whenever the clutch disk 22 is in engagement with the friction collar 43, the power takeoff member 31, and thus the load attached to the power takeoff member 31, can only rotate by action of the hand crank 42.

When a load providing a counter torque is applied to the power takeoff member 31, and the axial force on the clutch disk 22 resulting from the driving torque applied by the motor 12 to the shaft 15 is greater than or equal to the axial force on the power takeoff member 31 caused by the counter torque plus the restoring force of the spring 40 on the clutch disk 22, the clutch disk 22 drives the power takeoff member 31 as described above. Rotation of the power takeoff member 31 thereby transmits a rotary or positioning force to the load via the gear teeth 33.

If the axial force of the clutch disk 22 caused by the driving torque applied by motor 12 to the shaft 15 becomes less than the restoring force of the spring 40 on the clutch disk 22 plus the axial force caused by a counter torque acting on the power takeoff member 31, the clutch disk 22 is driven into engagement with the friction collar 43. Such action occurs in a manner similar to the annular drive collar 18 driving the clutch disk 22 described above. The rotation of the power takeoff member 31 from the counter torque causes the drive balls 37 to exert a rotary and axial force upon the clutch disk 22 by reason of their contact with the biconical drive cavity 36.

Engagement of clutch disk 22 with the friction collar 43 holds the power takeoff member 31 and the load thereon, substantially stationary against the counter torque because of the self-locking action of the ring gear 45 engaging with the worm gear 49. Any counter torque applied to rotate the power takeoff member 31, which forces the clutch disk 22 into engagement with the friction collar 43, is translated into an axial force along the worm gear shaft 80 (see FIG. 3). The axial force along the worm gear shaft 80 is transmitted through the ring gear 45 against the worm teeth 51 to create a positive locking action against back loading of the shaft 15 and/or the hand crank mechanism 41. Accordingly, the friction collar 43 cannot rotate in response to the counter torque when the ring gear 45 locks with the worm gear 49, preventing the load on the power takeoff member 31 from rotating. However, the friction collar 43 is still able to rotate in response to an external force applied to the hand crank 42. Additionally, because the ring gear 45 locks the hand crank mechanism 41 in response to the counter torque, the hand crank 42 is also prevented from freely rotating in response to the same counter torque on the power takeoff member 31. The self-locking feature thus prevents the dangerous situation (and potential injury to an operator of the stop clutch assembly 10) of the hand crank 42 rotating in response to a counter torque.

The interaction of the clutch disk 22 and friction collar 43 under different load conditions is summarized by the following table:

| Case | $F_m$ | $F_c$ | Relationship of Clutch Disk 22 and Friction Collar 43 | Manual Rotation of Load with Hand Crank 42 |
|---|---|---|---|---|
| 1 | 0 | 0 | ENGAGED | YES |
| 2 | $F_m < F_r$ | 0 | ENGAGED | YES |
| 3 | $F_m \geq F_r$ | 0 | DISENGAGED | NO |
| 4 | 0 | $F_c > 0$ | ENGAGED | YES |
| 5 | $F_m < F_r + F_c$ | $F_c > 0$ | ENGAGED | YES |
| 6 | $F_m \geq F_r + F_c$ | $F_c > 0$ | DISENGAGED | NO |

$F_m$ = Axial force applied to the clutch disk 22 resulting from torque applied by the motor 12 to the shaft 15.
$F_c$ = Axial force applied to the clutch disk 22 resulting from counter torque applied to the power takeoff member 31.
$F_r$ = Restoring force of the spring 40, where $F_r > 0$ in the direction of the clutch disk 22.

In a manner similar to the electric motor 12 driving the power takeoff member 31, the hand crank mechanism 41 is used to manually rotate the power takeoff member 31 to drive the load. Referring again to FIG. 1, the stop clutch assembly 10 is at rest. When an external force is applied to the hand crank 42, the worm gear 49 rotates the ring gear 45. Because there is no axial force on the clutch disk 22 from the drive collar 18 (the electric motor 12 is applying negligible driving torque to the shaft 15), the clutch disk 22 is biased into engagement with the friction collar 43. Thus, rotation of the hand crank 42 also rotates the clutch disk 22. In the manner described above, rotation of the clutch disk 22 rotates the power takeoff member 31 through the drive balls 37 in the biconical drive cavity 36, to drive the load thereon.

Although the hand crank mechanism 41 is primarily used for manual rotation of the load, the hand crank 42 can also be turned while the electric motor 12 is providing a torque to the shaft 15. For example, if the electric motor 12 stalls when driving a load on the power takeoff member 31, then the clutch disk 22 is still in engagement with the friction collar 43, since the net forces in the stop clutch assembly 10 are not sufficient to move the clutch disk 22 axially away from the friction collar 43. An operator can assist the motor by turning the hand crank 42 to provide additional torque to the power takeoff member 31 via the ring gear 45. The amount of external force, which translates into a torque on the hand crank 42, that the operator can contribute is limited by the shear pin 48 on the hand crank 42 to prevent damaging the internal components of the hand crank mechanism 41.

The present invention of the stop clutch assembly 10 provides a mechanism to conveniently and easily position a load using either an electric motor 12 or a manual hand crank 42. The hand crank 42 may be used to manually assist the electric motor 12 if the electric motor 12 stalls or loses excitation. The stop clutch assembly 10 also provides positive stop clutch action against a counter torque applied by the load. The self-locking feature of the ring gear 45 engaging the worm gear 49 prevents the counter torque from affecting the rotational position of the load. The stop clutch assembly 10 simultaneously provides a safety feature for the operator. Because the hand crank mechanism 41 is self-locking, the hand crank 42 will not rotate due to a counter torque applied to the power takeoff member 31. Additionally, the hand crank 42 does not rotate in response to excitation of the electric motor 12 since, when the electric motor 12 is driving a load, the clutch disk 22 is disengaged from the friction collar 43. Thus, the stop clutch assembly 10 allows an operator to be near the device while it is operating, without concern for rotation of the hand crank 42 in response to a counter torque.

It will be appreciated by those skilled in the art that changes could be made to the embodiment described above without departing from the broad inventive concept thereof. For example, it will be appreciated that the stop clutch assembly 10 as disclosed herein could be used in a variety of applications to position and/or drive various loads. Therefore, the type of motor, power takeoff member and hand crank mechanisms may differ to accommodate the different situations without departing from the spirit and scope of the present invention. It is understood, therefore, that this invention is not limited to the particular embodiments disclosed, but it is intended to cover modifications within the spirit and scope of the present invention as defined by the appended claims.

I claim:

1. A stop clutch assembly comprising:

a shaft for receiving a driving torque;

a drive collar concentrically fixed to said shaft;

a clutch disk rotatably disposed about said shaft and axially slidable thereon, said clutch disk having a first surface opposed to a collar surface of said drive collar, the first surface of said clutch disk and the collar surface of said drive collar each having formed therein at least one conical depression at a substantially equal distance from a center of the shaft, each conical depression in the first surface of said clutch disk being opposingly aligned with a corresponding conical depression in the collar surface of said drive collar to form a biconical clutch cavity therebetween, a clutch ball being lodged in each biconical clutch cavity;

a power takeoff member connected to a load, said power takeoff member being rotatably disposed about said shaft, a takeoff surface of the power takeoff member being opposed to a second surface of said clutch disk, the second surface of said clutch disk and the takeoff surface of the power takeoff member each having formed therein at least one conical depression at a substantially equal distance from the center of the shaft, each conical depression in the second surface of said clutch disk being opposingly aligned with a corresponding conical depression in the takeoff surface of the power takeoff member to form a biconical drive cavity therebetween, a drive ball being lodged in each biconical drive cavity; and a ring gear having a friction collar attached thereto, said ring gear rotatably disposed about said shaft, a surface of said friction collar being opposed to said clutch disk, wherein said clutch disk is engaged with said friction collar when said clutch disk is in a first position and said clutch disk is disengaged from said friction collar when said clutch disk is in a second position.

2. The stop clutch assembly of claim 1, wherein said clutch disk is engaged with said friction collar when the driving torque applied to said shaft is less than a predetermined threshold or the sum of a counter torque applied by the load to said power takeoff member and the predetermined threshold, and said clutch disk is disengaged from said friction collar when the torque applied to said shaft is greater than or equal to the predetermined threshold plus the counter torque applied by the load to said power takeoff member.

3. The stop clutch assembly of claim 2, further including a spring connected between said power takeoff member and said clutch disk, wherein a restoring force of the spring establishes the predetermined threshold.

4. The stop clutch assembly of claim 1, wherein a rotary motion of said ring gear is transferred to said power takeoff member when said clutch disk is engaged with said friction collar.

5. The stop clutch assembly of claim 1, further including a drive member engaging said ring gear, said drive member effecting a rotary motion of said ring gear when an external force is applied to said drive member, said drive member otherwise locking said ring gear.

6. The stop clutch assembly of claim 5, wherein said drive member is a worm gear.

7. The stop clutch assembly of claim 6, further including an actuating member for effecting the rotary motion of said ring gear by the external force.

8. The stop clutch assembly of claim 7, wherein the actuating member is a hand crank.

9. The stop clutch assembly of claim 7, further including a gear train connected between the actuating member and the worm gear.

10. The stop clutch assembly of claim 7, further including a shear pin which disconnects the actuating member from the worm gear when a predetermined torque applied by the actuating member is exceeded.

11. The stop clutch assembly of claim 10, wherein the predetermined torque is approximately 1.5 times a rated torque of a device providing the driving torque to the shaft.

12. The stop clutch assembly of claim 1, wherein a motor provides the driving torque to the shaft.

13. A stop clutch assembly comprising:
   a clutch disk rotatably disposed about a shaft and axially slidable thereon, said clutch disk having a first surface adjacent to a collar surface of a drive collar which is fixed to the shaft, the first surface of said clutch disk and the collar surface of said drive collar each having formed therein at least one conical depression at a substantially equal distance from a center of the shaft, each conical depression in the first surface of said clutch disk being opposingly aligned with a corresponding conical depression in the collar surface of said drive collar to form a biconical clutch cavity therebetween, a clutch ball being lodged in each biconical clutch cavity;

a power takeoff member connected to a load, said power takeoff assembly being rotatably disposed about the shaft, a takeoff surface of the power takeoff member being adjacent to a second surface of said clutch disk, the second surface of said clutch disk and the takeoff surface of the power takeoff member each having formed therein at least one conical depression at a substantially equal distance from the center of the shaft, each conical depression in the second surface of said clutch disk being opposingly aligned with a corresponding conical depression in the takeoff surface of the power takeoff member to form a biconical drive cavity therebetween, a drive ball being lodged in each biconical drive cavity; and a ring gear having a friction collar attached thereto, said ring gear rotatably disposed about said shaft, a surface of said friction collar being opposed to said clutch disk, wherein said clutch disk is engaged with said friction collar when said clutch disk is in a first position and said clutch disk is disengaged from said friction collar when said clutch disk is in a second position; and a drive member engaging said ring gear, said drive member effecting a rotary motion of said ring gear when an external force is applied to said drive member, said drive member otherwise locking said ring gear.

14. The stop clutch assembly of claim 13, wherein the rotary motion of said friction collar is transferred to said power takeoff member when said clutch disk is engaged with said friction collar.

15. The stop clutch assembly of claim 13, wherein said drive member is a worm gear.

16. The stop clutch assembly of claim 13, further including an actuating member for effecting the rotary motion of said ring gear by the external force.

17. The stop clutch assembly of claim 16, wherein the actuating member is a hand crank.

18. The stop clutch assembly of claim 16, further including a gear train connected between the actuating member and the drive member.

19. The stop clutch assembly of claim 16, further including a shear pin which disconnects the actuating member from the drive member when a predetermined torque applied by the actuating member is exceeded.

* * * * *